C. E. MORRIS.
CAROUSEL.
APPLICATION FILED MAR. 15, 1917.

1,327,725. Patented Jan. 13, 1920.

WITNESS:
R. C. Hamilton

INVENTOR.
Charles E. Morris
BY Warren D. House
His ATTORNEY ical part of the crank 3 or it may be a collar fixed thereon. Its function is to prevent the box from endwise movement on the crank 3.
UNITED STATES PATENT OFFICE.

CHARLES E. MORRIS, OF LEAVENWORTH, KANSAS, ASSIGNOR TO CHARLES W. PARKER, OF LEAVENWORTH, KANSAS.

CAROUSEL.

1,327,725.     Specification of Letters Patent.     Patented Jan. 13, 1920.

Application filed March 15, 1917. Serial No. 154,918.

*To all whom it may concern:*

Be it known that I, CHARLES E. MORRIS, a citizen of the United States, residing at Leavenworth, in the county of Leavenworth and State of Kansas, have invented a certain new and useful Improvement in Carousels, of which the following is a specification.

My invention relates to improvements in carousels.

One of the objects of my invention is to provide a crank box and horse rod of a carousel which may be easily and quickly connected with and disconnected from each other, but which will not be liable to accidental disconnection, which will have great strength and durability, and which will be simple in construction and cheap to manufacture.

A further object of my invention is to provide a crank box, adapted to be mounted on the crank shaft which supports and operates the horse rod of a carousel, which has its center of gravity so located that it will normally swing by gravity to its operative position, thereby enabling the horse rod to be easily connected therewith without any one being required to move the box to or hold it in position when connection therewith by the horse rod is being effected.

The novel features of my invention are hereinafter fully described and claimed.

In the accompanying drawing which illustrates the preferred embodiment of my invention, Figure 1 is an end elevation of my improved crank box.

Similar reference characters designate similar parts in the different views.

Figure 1:
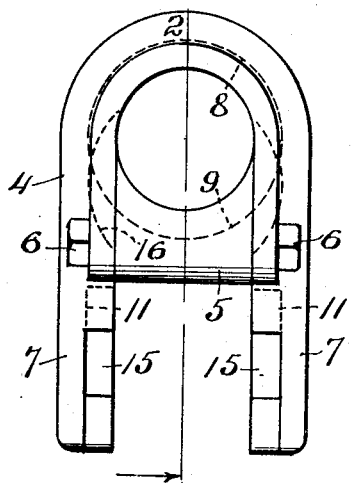

1 designates a horse rod, such as is commonly used to support and to give an up and down movement to an artificial horse or other animal of a carousel. 2 designates a rotary shaft of a carousel provided with a U-shaped crank 3 which carries a box which supports the horse rod 1.

The box comprises an inverted U-shaped upper member 4 and a lower member 5, which are releasably secured to each other by transverse bolts 6 which extend through the depending arms 7 of the upper box member.

Figure 2:
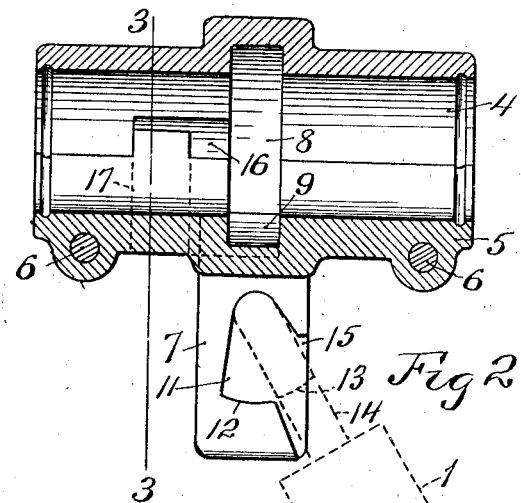
Fig. 2 is a vertical sectional view of the same on the line 2—2 of Fig. 1.
Figure 4:
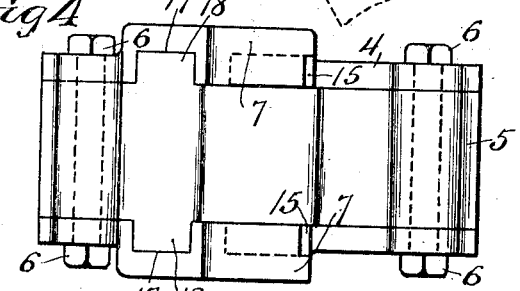
Fig. 4 is a bottom view of the same.
Figure 3:
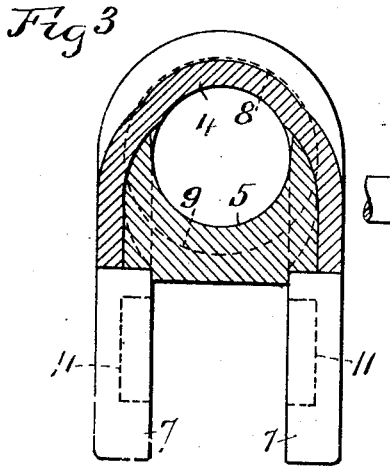
Fig. 3 is a cross section on the line 3—3 of Fig. 2.

The bore of the upper box member 4 is provided with a central arcuate recess 8 which registers with a similar recess 9 provided in the lower box member 5, as best shown in Fig. 2.

The recesses 8 and 9 are adapted to receive a central annular peripheral enlargement 10, with which the crank 3 is provided. This enlargement 10 may be an integral part of the crank 3 or it may be a collar fixed thereon. Its function is to prevent the box from endwise movement on the crank 3.

Figure 5:
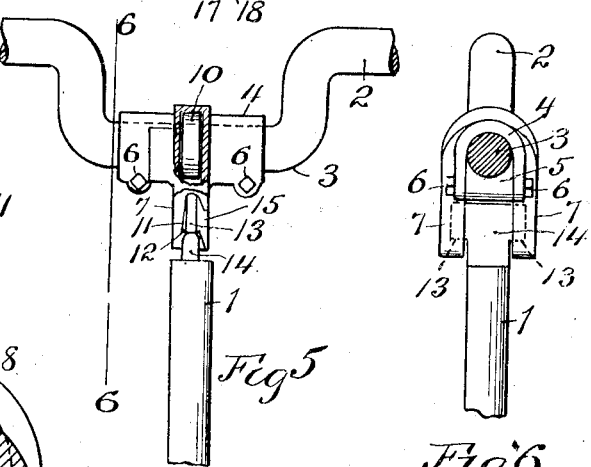
Fig. 5 is a side elevation, partly broken away, of my improved crank box, shown mounted on a crank shaft and having attached to it a horse rod, the upper portion of which is shown and which is embodied in my improvement.
Figure 6:
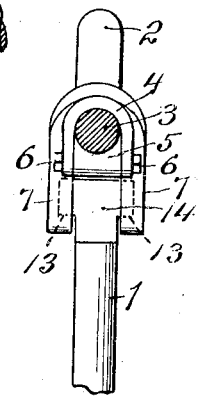
Fig. 6 is a cross section on the line 6—6 of Fig. 5.

As shown in Figs. 2 and 5, each arm 7 is provided on its inner side with a recess 11 and a concave seat 12 at the lower end of said recess.

Figure 7:
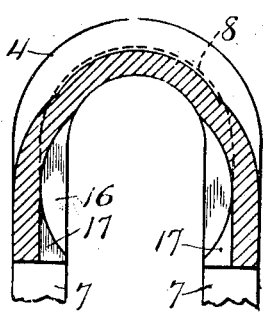
Fig. 7 is a view similar to Fig. 3, the lower box member being removed and the arms of the other box member being broken away.

The seats 12 are adapted to respectively support the two arms 13 of a T-shaped head 14 with which the upper end of the horse rod 1 is provided. Two like edges of the arms 7 are respectively provided with two grooves 15 which respectively communicate with the recesses 11 at the sides thereof. The recesses 11 are thus provided with side openings, through which the arms 13 of the head 14 may be inserted, when the horse rod 1 is inclined laterally to the position shown in dotted lines in Fig. 2, into the recesses 11, after which the horse rod 1 is swung to the vertical position, shown in Fig. 5, in which position the arms 13 will respectively rest on the seats 12. The width of the grooves 15 from the upper ends thereof to the seats 12 is less than the width vertically of the arms 13, so that when the horse rod 1 is swung to the operative vertical position, shown in Fig. 5, it cannot be accidentally detached from the arms 7, owing to the fact that the arms 13 extend above the grooves 15, and the latter are, preferably, located at the inner edges of the arms 7, with respect to the axis of the carousel of which the shaft 2 forms a part. When the carousel is in operation, the lower end of the horse rod 1 will swing outwardly, that is, to the left, as viewed in Figs. 2 and 5, the seats 12 and recesses 11 permitting of such lateral swinging of the horse rod. For the purpose of obtaining a maximum of strength, the arms 13 of the T-head 14 of the horse rod should be as short as possible, and the seats 12 as close as possible to the body of the head 14. For this reason, the depending arms 7 are spaced apart sufficient only for their being slipped over the crank 3. Inasmuch as the arms 7 are in the vertical plane of the arcuate recess 8 and peripheral enlargement 10 of the crank, the upper box member 4, in assembling the parts, could not be slipped vertically downwardly into its operative position on the crank 3, unless the arms 7 were spaced apart a distance equal to the diameter of the enlargement 10, or unless the groove 8 extended lengthwise the full length of the arms 7. As such extension of the groove 8 would weaken the arms 7, and if such arms were spaced apart sufficiently for the enlargement 10 to pass therebetween, the strength of the connection between the horse rod and the arms 7 would be greatly diminished. For this reason, there is provided in the bore of the box member 4, a recess 16 which extends endwise from the recess 8, Fig. 2, to a point beyond the adjacent outside edges of the arms 7. The left or outer end of the recess 16 terminates in two vertical grooves 17, Figs. 2 and 7, which extend to the lower edges of the body of the member 4, and which are located at the outer side of the arms 7. The grooves 17 are of sufficient width to permit the enlargement 10 of the crank 3 to pass upwardly therethrough until the top of said enlargement reaches the top of the recess 16. The latter is of a diameter sufficient such that the box member 4 may then be slid to the left, as viewed in Fig. 2, until the enlargement 10 enters the recess 8, at which time, the member 4 may be moved downwardly so as to rest upon the crank 3. The lower box member 5 may then be slipped upwardly between the arms 7 and against the lower side of the crank 3, the enlargement 10 of which enters the recess 9 in the member 5.

The box members 4 and 5 may then be secured to each other by inserting the bolts 6. The box member 5 is provided on opposite sides respectively with flanges 18 which fit respectively in the grooves 17.

The center of gravity of the box is such that it will normally swing by gravity to the operative position, that is, with the arms 7 extending vertically downwardly as shown in Fig. 1, 2 and 5. This is an important feature of my invention, as it enables the horse rod to be easily attached to the box without the latter having to be manually swung to or held in position while the horse rod is being attached thereto.

In attaching the horse rod, it is inclined laterally, as shown in Fig. 2, and the arms 13 are passed upwardly through the grooves 15 into the recesses 11 to the position shown in Fig. 2, after which the horse rod is swung to the left, as viewed in Fig. 2, to the vertical position shown in Fig. 5, in which position the arms 13 may respectively rest upon the seats 12. The parts are then in the operative position. To detach the horse rod, this operation is reversed.

I do not limit my invention to the structure shown and described, as modifications, within the scope of the appended claims, may be made without departing from the spirit of my invention.

What I claim is:—

1. In a carousel, a crank shaft having a crank, a horse rod, and an inverted U-shaped box member pivotally mounted on said crank and having each arm provided on its inner side with a recess having at its lower end a seat and having a groove in one edge communicating with said recess, the grooves in said arms being in like edges, the upper end of the horse rod having a T-shaped head insertible between said arms, the arms of the T being insertible respectively through said grooves into said recesses, and adapted, when the horse rod is swung to the vertical position, to respectively rest upon said seats.

2. In a carousel, a shaft having a crank, a horse rod, and a box member having two depending arms, each provided on its inner side with a recess, a seat at the lower end of said recess, and a groove in one edge and inner side communicating with said recess, the upper end of the horse rod being removably insertible through said grooves into said recesses and adapted to rest upon said seats.

3. In a carousel, a shaft having a crank, a horse rod having at its upper end a T-shaped head, and a U-shaped box member embracing said crank and provided on the inner side of each arm with a recess and a seat at the lower end thereof, the recess having a side opening, the arms of said T-shaped head being adapted to respectively enter said recesses and to rest upon said seats and removable therefrom only when the horse rod is inclined laterally to a pre-determined position, in which position the arms of the head may be withdrawn from said recesses through the openings at the sides thereof.

4. In a crank boxing, a shaft having a crank provided with an annular peripheral enlargement, and a box member having a bore fitted to said crank and provided in said bore with an arcuate recess adapted to receive said crank enlargement, the box member having two depending arms, the box member being open on its under side and being provided in its bore with a recess extending from the first named recess endwise beyond the adjacent side edges of said arms to a point which will permit of the crank enlargement being inserted upwardly and longitudinally through said second recess into the first named recess.

5. In a carousel, a shaft having a crank provided with an annular peripheral enlargement, a box member having a bore fitted to said crank and provided with an arcuate recess for receiving said crank enlargement, the box member having two depending arms and open on its under side and provided in its bore with a second recess extending from the first named recess endwise to a point which will permit said crank enlargement being inserted therethrough into the first named recess, and a horse rod having means for releasably engaging and being supported by said arms.

6. In a crank box, a box member having an open side and two arms depending from the open side, and provided in its bore with an arcuate recess, and provided in its bore with a second recess extending from the first named recess endwise to a point beyond the adjacent edges of said arms and distant therefrom greater than the width of the first named recess.

In testimony whereof I have signed my name to this specification.

CHARLES E. MORRIS.